(12) United States Patent
Docter et al.

(10) Patent No.: US 10,247,880 B2
(45) Date of Patent: Apr. 2, 2019

(54) FIBER BRAGG GRATING INTERROGATOR ASSEMBLY AND METHOD FOR THE SAME

(71) Applicant: Technobis Group B. V., Alkmaar (NL)

(72) Inventors: Vincent Johannes Docter, Alkmaar (NL); Mohammad Saeed Tahvili, Alkmaar (NL)

(73) Assignee: Technobis Group B. V., Alkmaar (NL)

( * ) Notice: Subject to any disclaimer, the term of this patent is extended or adjusted under 35 U.S.C. 154(b) by 0 days.

(21) Appl. No.: 15/265,439

(22) Filed: Sep. 14, 2016

(65) Prior Publication Data
US 2017/0075064 A1    Mar. 16, 2017

(30) Foreign Application Priority Data

Sep. 16, 2015 (NL) .................................... 2015448

(51) Int. Cl.
*G02B 6/12* (2006.01)
*G02B 6/02* (2006.01)
(Continued)

(52) U.S. Cl.
CPC ........ *G02B 6/12023* (2013.01); *G01B 11/165* (2013.01); *G01B 11/168* (2013.01);
(Continued)

(58) Field of Classification Search
CPC ............. G02B 6/12; G02B 6/02; G02B 11/16
(Continued)

(56) References Cited

U.S. PATENT DOCUMENTS 5,319,435 A * 6/1994 Melle ..................... G01B 11/16
250/227.18
6,084,050 A * 7/2000 Ooba ...................... G02F 1/065
359/288

(Continued)

FOREIGN PATENT DOCUMENTS

EP       2811257 A1    12/2014

OTHER PUBLICATIONS

Dutch Search Report for Dutch Application No. NL2015448, dated Mar. 15, 2016, 10 pages.
(Continued)

*Primary Examiner* — Kaveh C Kianni
(74) *Attorney, Agent, or Firm* — International IP Law Group, PLLC (57) ABSTRACT

A fiber Bragg grating interrogator assembly, comprising: an optical fiber including a fiber Bragg grating (FBG; 122) having a variable Bragg wavelength ($\lambda_B$) and a dynamic range of interest ($\Delta\lambda_{dyn,B}$) over which the Bragg wavelength ($\lambda_B$) can shift during use; —a light source operably connected to the optical fiber, and configured to illuminate the fiber Bragg grating to solicit a response therefrom; and an response analyzer, including: a spectrally selective device having an input port and a plurality of output ports (149-n), wherein the input port is operably connected to the optical fiber and wherein each of the output ports is associated with a respective spectral range ($\Delta\lambda_n$), said spectrally selective device being configured to provide a spectral energy distribution of a response of the fiber Bragg grating received on the input port onto said output ports.

8 Claims, 3 Drawing Sheets

(51) Int. Cl.
    *G01B 11/16*    (2006.01)
    *G01D 5/353*    (2006.01)
(52) U.S. Cl.
    CPC ......... *G01B 11/18* (2013.01); *G01D 5/35316* (2013.01); *G02B 6/02195* (2013.01); *G02B 6/12019* (2013.01); *G02B 6/12033* (2013.01)
(58) Field of Classification Search
    USPC .......................................................... 385/37
    See application file for complete search history.

(56) References Cited

U.S. PATENT DOCUMENTS

| | | | | |
|---|---|---|---|---|
| 6,278,813 B1* | 8/2001 | Takada | ............... | G02B 6/12011 385/24 |
| 6,324,318 B1* | 11/2001 | Suzuki | ............... | H04J 14/0221 385/1 |
| 6,519,062 B1* | 2/2003 | Yoo | ............... | H04L 45/00 398/49 |
| 6,532,091 B1* | 3/2003 | Miyazaki | ............. | H04B 10/299 359/237 |
| 7,355,716 B2* | 4/2008 | de Boer | ............... | A61B 5/0059 356/479 |
| 7,359,597 B1* | 4/2008 | Iazikov | ............... | G02B 6/105 359/34 |
| 8,385,705 B2* | 2/2013 | Overton | ............... | C03C 13/046 385/126 |
| 8,526,472 B2* | 9/2013 | Flanders | ............... | H01S 5/5018 372/20 |
| 9,110,259 B1 | 8/2015 | Black et al. | | |
| 2004/0033004 A1* | 2/2004 | Welch | ............... | B82Y 20/00 385/14 |
| 2004/0096151 A1 | 5/2004 | Svilans et al. | | |
| 2005/0169567 A1* | 8/2005 | Bernasconi | ........ | G02B 6/12011 385/11 |
| 2006/0045412 A1 | 3/2006 | Xiao et al. | | |
| 2008/0166095 A1* | 7/2008 | Popovic | ................. | B82Y 20/00 385/126 |
| 2014/0233891 A1* | 8/2014 | Pottier | ............... | G02B 27/4244 385/37 |
| 2017/0017042 A1* | 1/2017 | Menard | ................ | G02B 6/3596 |

OTHER PUBLICATIONS

European Search Report, EP Appln. 16188939.9-1568, Applicant: Technobis Group B.V., dated Jan. 16, 2017, pp. 7, English.

* cited by examiner

FIBER BRAGG GRATING INTERROGATOR ASSEMBLY AND METHOD FOR THE SAME

CROSS REFERENCE TO RELATED APPLICATION

This application claims priority to The Netherlands Patent Application Serial No. NL 2015448 16, filed Sep. 16, 2015.

BACKGROUND

In the field of aerospace, the use of strong and light weight composite materials is increasing. A notorious drawback of these materials is that the process of their failure is rather complex, and damage may develop virtually invisibly from within composite structures, such as aircraft wings and wind turbine blades. To prevent accidents, regular manual inspection of these structures may therefore be required.

It has been suggested to automate the surveillance of mechanically loaded structures by means of an active health monitoring system including a fiber Bragg grating (FBG) sensor that is interrogated by an arrayed wave guide (AWG) based interrogator, which system may infer the existence of various kinds of damage to the monitored structure from changes in the Bragg wavelength. In such health monitoring systems the initial Bragg wavelength of an FBG sensor may typically be situated between the respective center wavelengths of two associated output ports or output channels of the AWG, such that a response provided by the FBG sensor upon interrogation is divided between those ports. When, during use, the Bragg wavelength of the FBG changes due to the fact that it is strained, the power ratio between the two output ports also changes.

One drawback of the above-described configuration of an FBG/AWG health monitoring system is that the sensitivity of the system is greatest when the initial Bragg wavelength is located precisely between the center wavelengths of the two associated output ports of the AWG. It is rather difficult, however, to effect this condition on installation. Accordingly, a freshly installed health monitoring system may generally have a less than optimal sensitivity. Another drawback is that an FBG sensor may preferably have a relatively large dynamic range over which its Bragg wavelength may shift during use. Consequently, a Bragg wavelength may easily shift outside the spectral range of at least one of the output ports, which may render an accurate wavelength determination impossible.

To mitigate the aforementioned drawback, the applicant invented a fiber Bragg grating interrogator assembly with spectrally overlapping output ports, and a corresponding method of interrogating a fiber Bragg grating, described in the Dutch patent NL 2010940.

It has been found that such a fiber Bragg grating interrogator assembly can be made substantially polarization independent, however, for example due to production variations, particularly of the optical waveguides, there remains a relatively small polarization dependent response.

SUMMARY

The invention relates to a fiber Bragg grating interrogator assembly, and to a method for interrogating a fiber Bragg grating.

It is an object of the present invention to provide for a fiber Bragg grating interrogator assembly and a corresponding method of interrogating a fiber Bragg grating that overcome or mitigate one or more of the aforementioned drawbacks.

In particular, it is an aim of the present invention to minimize the polarization dependency of a fiber Bragg grating interrogator assembly, for example of the applicant's assembly described in the Dutch patent 2010940, and of the corresponding method. Additionally, it is an object of the present invention to improve the assembly, e.g. to measure two orthogonal polarizations of every fiber Bragg grating of the assembly.

To this end, a first aspect of the present invention is directed to a fiber Bragg grating interrogator assembly. The fiber Bragg grating interrogator assembly may comprise an optical fiber including a fiber Bragg grating (FBG). The FBG may have a variable Bragg wavelength $\lambda_B$ and a dynamic range of interest $\Delta\lambda_{dyn,B}$ over which the Bragg wavelength $\lambda_B$ may shift during use. The assembly may also comprise a light source that is operably connected to the optical fiber, and configured to illuminate the fiber Bragg grating to solicit a response therefrom. The fiber Bragg grating interrogator assembly may further comprise a response analyzer, which may include a spectrally selective device having an input port and a plurality of output ports. The input port may be operably connected to the optical fiber, while each of the output ports may be associated with a respective spectral range, and the spectrally selective device may be configured to provide a spectral energy distribution of a response of the FBG that is received on the input port, onto said output ports. According to an aspect of the invention, the spectrally selective device is configured to split two orthogonal polarization components of incoming light onto substantially non-overlapping spectral ranges in the spectral energy distribution of said output ports, particularly such that each output port has one spectral range for each of the two polarization components. It is noted that the term "non-overlapping" can be understood to mean sufficiently non-overlapping to be spectrally resolved or distinguished. The response analyzer includes a processing unit that is configured to use detection results regarding the split orthogonal polarization components to correct a polarization dependency of the spectrally selective device.

Instead of minimizing the wavelength shift between two polarization components of incoming light in the FBG interrogator assembly, the presently disclosed assembly intends to take advantage of the two polarization components present in the incoming light. By splitting the two orthogonal polarization components of incoming light onto substantially non-overlapping spectral ranges in the spectral energy distribution of said output ports (each pair of substantially non-overlapping spectral ranges particularly being associated with the same output port), the assembly allows an included processing unit to measure polarization and to use the detection results regarding the split orthogonal polarization components to correct a polarization dependency of the spectrally selected device. In this way, the polarization dependency of a fiber Bragg grating interrogator assembly can thus be efficiently compensated for. This increases the sensitivity of the assembly and enables a very accurate determination of the Bragg wavelength of the FBG. Furthermore, additional information on the polarization of the incoming light can be exploited.

In a preferred embodiment of the assembly, the spectrally selective device is configured to split the polarization components of incoming light into a first polarization component comprising a transverse electric (TE) mode wave and into a second polarization component comprising a transverse magnetic (TM) mode wave onto substantially non-overlapping spectral ranges in the spectral energy distribution of said output ports. Preferably, the spectrally selective device comprises an arrayed wave guide grating (AWG). An arrayed wave guide grating has several advantages over possible alternatives as for example a polarization filter in front of a chip or in a chip, or a polarization beam splitter in a chip or in a fiber: it makes the assembly cheaper, and does not need detailed alignment. Moreover, in polarization filters, one polarization mode may be lost making it less efficient. Polarization beam splitters take more place and are more complicated than an AWG.

In a more preferred embodiment, the spectrally selective device comprises tunable waveguides, arranged to be tuned such that the polarization dispersion in the spectral energy distribution of said output ports is optimized to split two orthogonal polarization components of incoming light onto substantially non-overlapping spectral ranges in the spectral energy distribution of said output ports. Optical waveguides, in particular ridge waveguides having a substantially rectangular core region cross-section, can be tuned by scaling the width and/or the height of said substantially rectangular core region cross-section, thus changing the difference in phase velocity between two polarized components, as is known to a person skilled in the art. By scaling a width/height ratio, the TE-TM wavelength shift can be minimized (but not cancelled) by minimizing the phase velocity difference between a TE and a TM component, as is done in some prior art devices, or, as in the present invention, optimized to split two orthogonal polarization components of incoming light onto substantially non-overlapping spectral ranges in the spectral energy distribution of said output ports, by making the phase velocity difference between a TE and a TM component as large as possible, thus allowing to take advantage of additional information on polarization.

Preferably, an assembly according to an aspect of the present invention further comprises a plurality of photodetectors optically coupled to said plurality of output ports in a one-to-one relationship, wherein each photodetector is configured to generate a signal indicative of an intensity of an optical signal received at the respective output port, and a processing unit, operably connected to the plurality of photodetectors, and configured to determine a current Bragg wavelength of the fiber Bragg grating from the signals of the photodetectors including correction for the polarization dependency of the spectrally selective device. Monitoring changes in the Bragg wavelength over a large wavelength range provides a reliable indicator for the health of a monitored system.

In an advantageous embodiment of the assembly, the processing unit is configured to determine the current Bragg wavelength as an intensity-weighted mean wavelength including correction for the polarization dependency of the spectrally selective device. Preferably, the processing unit is also configured to determine the polarization correction wavelength as a ratio-based weighted mean wavelength of two polarization intensity-weighted mean wavelengths. The possible difference in intensity at the output ports between the two polarization components of the optical signal is thus reckoned in.

A second aspect of the present invention is directed to a method of interrogating a fiber Bragg grating. The method may comprise providing a fiber Bragg grating having a variable Bragg wavelength and a dynamic range of interest over which the Bragg wavelength can shift during use. The method may also comprise illuminating the fiber Bragg grating to solicit a response therefrom, and splitting the response into a plurality of output channels, each output channel having a respective spectral range. The method comprises splitting by the spectrally selective device of the two orthogonal polarization components of incoming light onto substantially non-overlapping spectral ranges in the spectral energy distribution of said output ports, particularly such that each of the output ports receives a respective pair of substantially non-overlapping spectral ranges of the two polarization components (i.e. the two split polarization components do not have their own dedicated output ports). A processing unit uses detection results regarding the split orthogonal polarization components to correct such that a polarization dependency of the spectrally selective device. In this way, the polarization dependency of the assembly can be accurately corrected for in the determination of an FBG's Bragg wavelength.

In a preferred embodiment, the method according to a second aspect of the invention includes tuning of waveguides of the spectrally selective device such that the polarization dispersion in the spectral energy distribution of said output ports is optimized to split two orthogonal polarization components of incoming light onto substantially non-overlapping spectral ranges in the spectral energy distribution of said output ports. Preferably, the method further comprises determining a polarization correction factor as a ratio-based weighted mean wavelength of two polarization intensity-weighted mean wavelengths, leading to the above-mentioned advantages.

With regard to the terminology used in this text, the following is noted. The spectral range $\Delta\lambda_n$ of the n-th output port or output channel of the spectrally selective device may be construed to be the wavelength range over which the portion of the spectrally selective device's transmission power spectrum associated with the n-th output port lies within 20 dB, and preferably within 15 dB, of its peak; i.e. above the −20 dB resp. −15 dB level below the peak. A spectral range $\Delta\lambda_n$ may typically be centered on the center wavelength $\lambda_n$ of the respective output port. Output ports may be considered sorted based on their center wavelengths. Accordingly, when output ports A, B, C and D have respective center wavelengths 1548 nm, 1550 nm, 1551 nm, 1549 nm, their successive order is A, D, B, C; i.e. A and D may be considered successive output ports, while A and B may not.

It is understood that although FBGs and fiber Bragg grating response analyzers have interesting and useful applications in the technical field of aerospace, as alluded to above, their use is not limited thereto. The presently disclosed fiber Bragg grating assembly and method may, for instance, be used to monitor the mechanical state of all types of buildings and engineering structures. More generally even, they may be employed in non-distributed or distributed monitoring systems, capable of monitoring not only strain, but also other quantities like temperature, humidity, pressure, etc. In the case of a distributed monitoring system, which may involve a long optical fiber in which a plurality of FBGs are provided at certain intervals, these quantities may conveniently be monitored simultaneously at various locations, for instance at equidistantly spaced apart measuring points down a deep bore hole.

These and other features and advantages of the invention will be more fully understood from the following detailed description of certain embodiments of the invention, taken together with the accompanying drawings, which are meant to illustrate and not to limit the invention.

DETAILED DESCRIPTION OF SPECIFIC EMBODIMENTS

Figure 1:
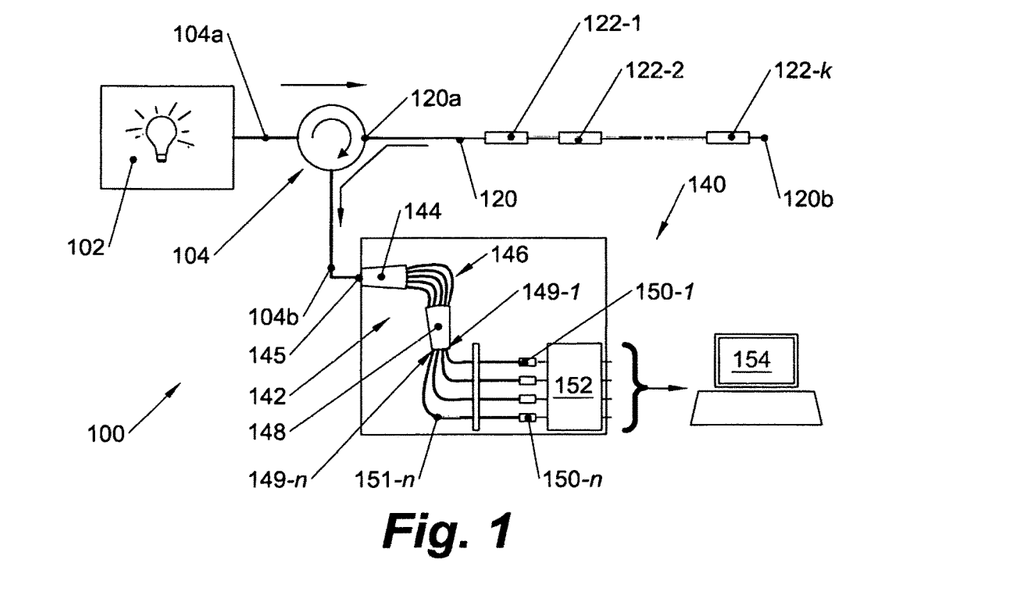
FIG. 1 schematically illustrates an exemplary embodiment of a fiber Bragg grating interrogator assembly according to the present invention.

FIG. 1 schematically illustrates an exemplary embodiment of a fiber Bragg grating interrogator assembly 100 according to the present invention. Below, the assembly 100 will be described in general terms, where appropriate with reference to the embodiment of FIG. 1.

The fiber Bragg grating interrogator assembly 100 may typically include a light source 102, an optical circulator 104, an optical fiber 120 including at least one fiber Bragg grating (FBG) 122, and a response analyzer 140.

The light source 102 may in principle be any light source capable of emitting light in a spectral range that includes the Bragg wavelength (or better: the dynamic range of interest) of the at least one FBG 122. The light source may preferably be a continuous instead of a pulsed light source. In one embodiment, for example, it may be a broad band light source, while in another embodiment, it may be a (continuous) variable wavelength laser that is capable of scanning action under the control of integrated electronics.

In one embodiment of the assembly 100, such as the depicted embodiment, the response analyzer 140 may be configured to process the reflection responses of the at least one FBG 122. In such an embodiment, the optical circulator 104 may serve to operably interconnect the light source 102, a first end 120a of the optical fiber 120, and an input port 145 of the spectrally selective device 142 that forms part of the response analyzer 140. It is understood that the optical circulator 104 may be a three-port device that is designed such that light entering a certain port exits from the next (in cyclic succession). Accordingly, as in the depicted embodiment, the light source 102 may be optically coupled to the first port, the first end 120a of the optical fiber 120 may be optically coupled to the second port, and the input port 145 of the spectrally selective device 142 may be optically coupled to the third port of the optical circulator 104, all such that, in operation, light emitted by the light source 102 is transmitted into the optical fiber 120, while light reflected by the at least one FBG 122 in the optical fiber is transmitted to the input port of the AWG 142.

In another embodiment, the assembly 100 may be configured to feed transmission responses of the at least one FBG 122 to the response analyzer 140. In such an embodiment, the input port 145 of the response analyzer 140 may be connected directly to the second end 120b optical fiber, while the optical circulator 140 may be configured to operably interconnect the light source 120, the first end 120a of the optical fiber 120, and an optical absorber, which may be coupled to its first, second and third ports of the optical circulator 140, respectively.

The optical fiber 120 may extend between a first end 120a and a second end 120b. In between its first and second ends 120a, 120b, it may include at least one, and typically a plurality of k FBGs 122, each of which may yield a response in reaction to illumination by light from the light source 102. A response may be either a reflection response or a transmission response, depending on the configuration of the assembly 100.

In the depicted embodiment, the FBGs 122 are set up to deliver a reflection response. Accordingly, each FBG 122 may be associated with a reflection power spectrum with a respective spectral range $\Delta\lambda_{B,k}$ centered on a respective Bragg wavelength $\lambda_{B,k}$, and a respective dynamic range of interest $\Delta\lambda_{dyn,B,k}$ over which the Bragg wavelength may shift during operation. A width of the spectral range of an FBG 122 (as defined with respect to the 20 dB (and preferred 15 dB) limit in analogy with the spectral range of an output port of the spectrally selective device) may typically be in the range of 0.1-0.2 nm, while a width of the dynamic range of interest may typically be of the order of 1 nm. Different FBGs 122 may preferably have mutually non-overlapping dynamic ranges, such that each FBG may be uniquely associated with specific output ports 149 of the AWG 142, which may thus uniquely register that FBG's reflection power spectrum.

In an embodiment of the assembly 100 wherein the response analyzer 140 is set up to process the reflection responses of the FBG's, such as the depicted embodiment, the second end 120b of the optical fiber 120 may be fitted with an optical absorber to prevent the transmission responses of the FBG's 122 from being reflected at the second end 120b, back to the optical circulator 104 and into the input port 145 of the response analyzer 140.

The response analyzer 140 may include a spectrally selective device 142, which may in principle be of any suitable type. In the depicted exemplary embodiment, the spectrally selective device includes an arrayed waveguide grating (AWG) 142. In other embodiments, however, the spectrally selective device may be of a different type, and for instance include a photonic crystal, or any other device showing a birefringent effect during dispersion The response analyzer 140 may further typically include a plurality of photodetectors 150, an analog-to-digital converter (ADC) 152, and a processing unit 154.

The AWG 142 may include an input light distribution component 144, an output light distribution component 148, and an array 146 of waveguides that optically interconnect the input light distribution component 144 and the output light distribution component 148. The input and output light distribution components 144, 148 may be of any suitable design, and for instance include free space, star couplers, Rowland circles, mode expanders, and/or slab waveguides. The input light distribution component 144 may provide for a single input port 145 that is in optical communication with the (third port of the) optical circulator 104 via an input waveguide 104b, while the output light distribution component 148 may provide for a plurality of n output ports 149. Each output port corresponds to a respective output channel. For clarity of exposition, FIG. 1 schematically depicts an AWG 142 with a total of four output ports 149; it is understood, however, that actual embodiments of the AWG 142 may feature a different number n of output ports 149. This number may preferably be related to the number of FBGs 122 to be interrogated, in particular in such a ratio that each FBG 122 is uniquely associated with at least three output ports 149. As regards the array of waveguides 146, it should be noted that adjacent array waveguides may have a different effective length, the effective length differential ΔL between adjacent waveguides being constant. Although the array 146 illustrated in FIG. 1 comprises only five wave guides for illustrative purposes, AWGs may typically include more than five waveguides; fewer are also possible.

In operation light reflected by the at least one FBG 122 in the optical fiber 120 may enter the input light distribution component 144 from the input waveguide 104b connected to the input port 145. The input light distribution component 144 may then distribute the light signal to the array waveguides, such that each array waveguide receives a fraction of the light signal, which it carries to the output light distribution component 148. A light signal fraction travelling through a long array waveguide takes longer to enter the output light distribution component 148 than a light signal fraction travelling through a shorter array waveguide. Unless the length differential ΔL between adjacent array waveguides is a multiple of the wavelength of the light, the light signal fraction travelling through a long array waveguide enters the output light signal distribution in a different phase than the light signal fraction travelling along the shorter waveguide. Consequently, upon entering the output light distribution component 148, the light signal is effectively diffracted at a wavelength dependent diffraction angle, and focused on the different output ports 149. A first output port 149-1 may thus receive light with wavelengths in a first spectral range Δλ1, a second output port 149-2 may receive light with wavelengths in a second spectral range Δλ2, etc. The placement of the output ports on the image plane/surface determines the boundaries of their respective spectral ranges.

The spectrally selective device 142 employed in the fiber Bragg grating interrogator assembly 100 may generally be configured such that the respective spectral ranges Δλn, Δλn+1, Δλn+2 of each at least three successive output ports 149-n, 149-(n+1), 149-(n+2) of a plurality of output ports 149 associated with a certain FBG 122 exhibit a mutual partial overlap. The partial overlap may be such that the FBG's Bragg wavelength λB falls inside the spectral ranges Δλn, Δλn+1, Δλn+2 of at least three successive output ports over the dynamic range of interest Δλdyn,B of the FBG 122. A suitable arrangement may, for instance, be obtained by using output ports with spectral ranges of equal width, wherein consecutive spectral ranges are offset relatively to each other by one third of that width. Thus, when a first output port 149-1 has a spectral range Δλ1 extending from wavelength λ1 to wavelength λ1', then the second output port 149-2 may have a spectral range Δλ2 extending from λ1+(⅓)(λ1'−λ1), while the third output port 149-3 may have a spectral range Δλ3 extending from λ1+(⅔)(λ1'−λ1), etc.

To increase the sensitivity of the assembly 100 to changes in the Bragg wavelength, a preferred embodiment may even be configured such that the respective spectral ranges Δλn, Δλn+1, Δλn+2, Δλn+3 of each at least four successive output ports 149-n, 149-(n+1), 149-(n+2), 149-(n+3) of the plurality of output ports 149-n exhibit a mutual partial overlap, while the FBG's Bragg wavelength λB falls inside the spectral ranges Δλn, Δλn+1, Δλn+2, Δλn+3 of at least four successive output ports over the dynamic range of interest Δλdyn,B of the FBG 122.

As regards the use of an AWG-based spectrally selective device 142, it may be noted that although the technology of AWGs is in itself known in the art, AWGs are mainly used (and developed) as demultiplexers in the field of optical telecommunications, in particular for use in wavelength-division multiplexing (WDM) systems. Such AWG's are generally neither configured nor suitable for use in the presently disclosed interrogator assembly 100. This is because AWG demultiplexers for use in WDM systems serve to split an optical signal of different wavelengths in different non-overlapping channels, since the information contents of different channels have no bearing on one another. Accordingly, AWG demultiplexers are normally configured such that the spectral ranges of their output ports—as defined above with regard to the 20 dB (and preferred 15 dB) limit—do not overlap, while such overlap is a practical necessity for an AWG to be used in the presently disclosed interrogator assembly.

The spectrally selective device 142 employed in the fiber Bragg grating interrogator assembly 100 according to the present invention is generally configured to split two orthogonal polarization components of incoming light onto substantially non-overlapping spectral ranges in the spectral energy distribution of said output ports 149-n. According to the present invention, a processing unit 154 is configured to use detection results regarding the split orthogonal polarization components to correct a polarization dependency of the spectrally selective device 142. When an output port 149-n has a spectral range of Δλn extending from wavelength λx to wavelength λy, then a channel response of a first polarization component, for example a TM mode, may have a spectral range of Δλn/2 extending from wavelength λx to wavelength (½)(λy−λx), and a channel response of a second polarization component, for example a TE mode, may have a spectral range of Δλn/2 extending from wavelength (½)(λy−λx) to wavelength λy.

Each of the output ports 149-n of the spectrally selective device 142 may be in optical communication, for instance via a respective waveguide 151-n, with a respective photodetector 150-n, such as a photodiode. Each of the photodetectors 150-n may be configured to convert a light signal, in particular light reflected or transmitted by an associated FBG 122-k, into an electric signal indicative of a strength of the light signal. The signal may be an analog signal, in which case the signal may be sampled by the ADC 152, and converted into digital form. The optionally digitized electric signals of the photodetectors 150-n may be fed to the processing unit 154 for analysis.

In FIG. 1, the processing unit 154 is schematically depicted as a personal computer for ease of recognition. It is understood, however, that the processing unit 154 may essentially comprise little more than a processor or IC programmed to analyze power ratios that exist between the output ports 149 associated with a certain FBG 122, and to determine a current Bragg wavelength a of that FBG from those power ratios, including a correction of the polarization dependency of the spectrally selective device 142, optionally using knowledge of the shape of the power spectrum of the FBG.

Figure 2:
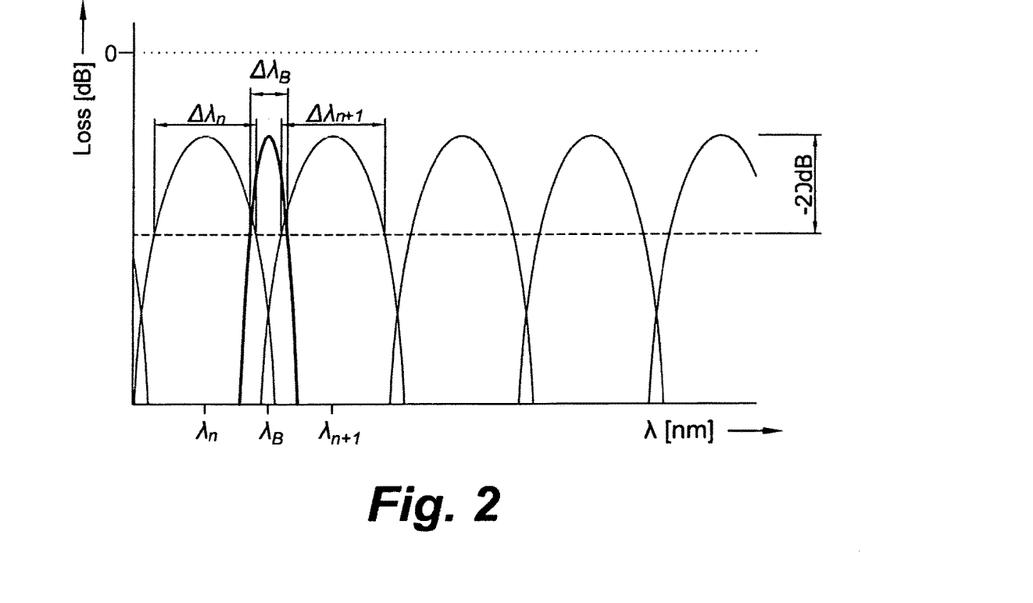
FIG. 2 schematically illustrates a partial transmission power spectrum of a spectrally selective device of a conventional fiber Bragg grating interrogator assembly similar to that shown in FIG. 1, including a power spectrum of an interrogated fiber Bragg grating.

FIG. 2 schematically illustrates a partial transmission power spectrum of a conventional AWG-based FBG interrogator assembly, including a (reflection or transmission) power spectrum of an interrogated FBG. The diagram, which serves to illustrate qualitative properties, is not drawn to scale.

As may be inferred from FIG. 2, the AWG in question includes a plurality of output ports, each giving rise to an inverted-parabola-like transmission curve in the transmission power spectrum. A first of them is centered on a wavelength λn, while a second, adjacent one is centered on a wavelength λn+1. As indicated in the Figure, the first and second transmission curves have respective, non-overlapping spectral ranges Δλn and Δλn+1.

The FBG interrogator assembly is configured such that the Bragg wavelength λB of the interrogated FBG is situated between the respective center wavelengths λn, λn+1 of the two associated output ports n and n+1 of the AWG, such that the spectral range ΔλB of the FBG partially overlaps with the spectral ranges Δλn and Δλn+1 of those output ports. Accordingly, the light reflected by the FBG upon interrogation is divided between those output ports. When during use the Bragg wavelength λB of the FBG changes due to the fact that it is strained, the FBG's response curve will shift accordingly, and the power ratio between the two output ports will change. This change in power ratio may serve for determination of the direction in which the Bragg wavelength λB of the FBG has shifted, and possibly also the magnitude of the shift.

As mentioned, however, the response analyzer setup reflected by FIG. 2 embodies two important drawbacks. One drawback is that the sensitivity of the response analyzer is generally greatest when the initial Bragg wavelength a is located precisely between the center wavelengths λn, λn+1 of the two associated output ports n, n+1 of the AWG. Unfortunately, it is rather difficult to attach an FBG to a structure to be monitored in such a way that the FBG wavelength is matched to the AWG response. Accordingly, an interrogator assembly with a freshly installed FBG may generally have a less than optimal sensitivity. As a countermeasure one may adjust the center wavelengths of the output ports of the AWG by means of a temperature controller associated therewith, but this complicates the structure and operation of the response analyzer. Another drawback is that an FBG may preferably have a relatively large dynamic range over which its Bragg wavelength may shift during use. Consequently, a current Bragg wavelength may easily shift outside the spectral range of its two associated output ports.

Another type of interrogator assembly overcomes these drawbacks. As explained above, an FBG 122 in the FBG interrogator assembly 100 may not be associated with two output ports having non-overlapping spectral ranges, but with a plurality of output ports 149, wherein the spectral ranges of each at least three successive output ports partially overlap, such that the FBG's Bragg wavelength falls inside the spectral ranges of at least three successive output ports over the dynamic range of interest of the FBG. That is, such that over the FBG's entire dynamic range, the power of its response is divided between at least three successive output ports.

Figure 3:
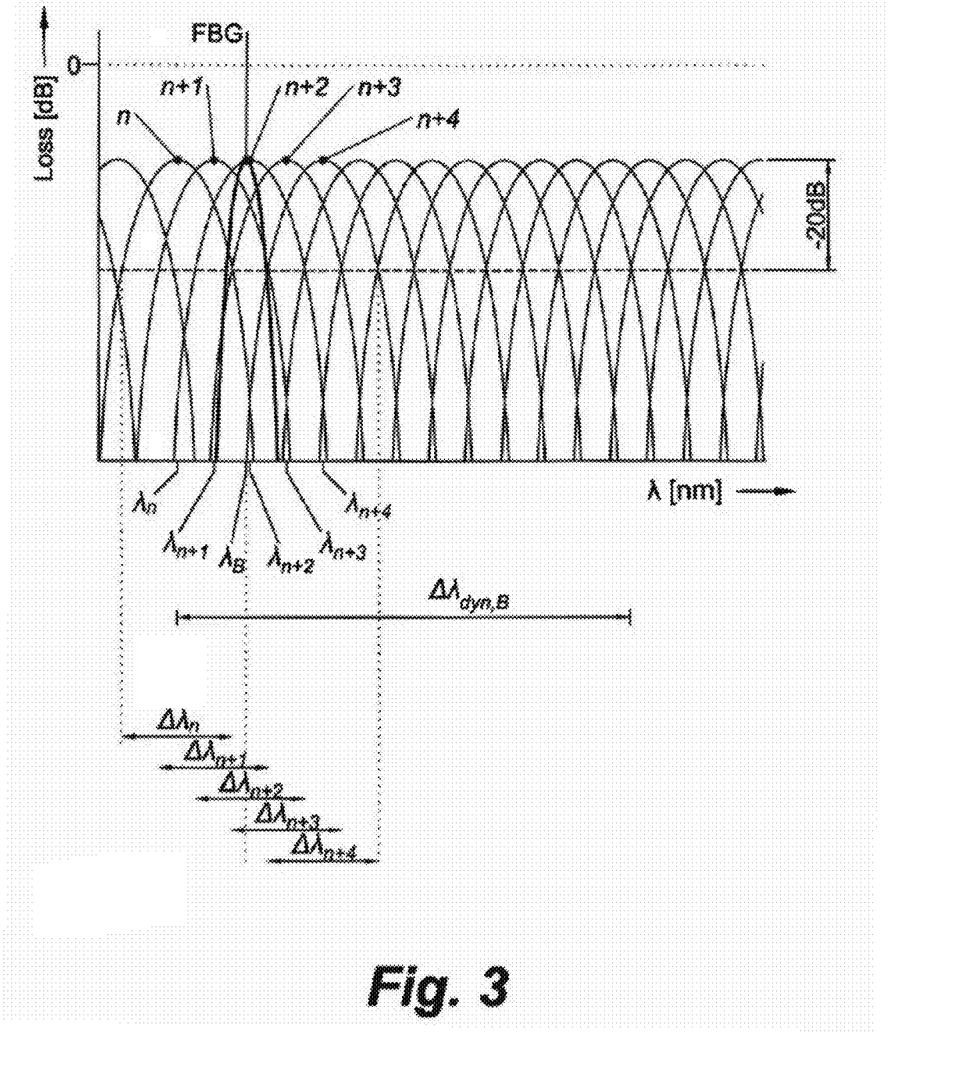
FIG. 3 schematically illustrates a partial transmission power spectrum of the spectrally selective device of the fiber Bragg grating interrogator assembly according to the present invention shown in FIG. 1, including a (reflection) power spectrum of an interrogated fiber Bragg grating.

This configuration of the interrogator assembly 100 may be schematically illustrated by the diagram of FIG. 3, which depicts a partial transmission power spectrum of the spectrally selective device of the assembly, and a reflection power spectrum of an interrogated FBG.

As may be inferred from FIG. 3, the AWG 142 of the interrogator assembly 100 in question includes a plurality of output ports 149, each giving rise to an inverted-parabola-like transmission curve in the transmission power spectrum. In FIG. 3, the transmission curves belonging to different output ports are identical in shape, but although this is a generally desirable quality, this need not necessarily be the case in other embodiments. Five arbitrary successive transmission curves have been labeled with the numbers of their respective output ports 149: n, n+1, n+2, n+3, n+4. The first of these five ports is centered on a wavelength λn; the second is centered on a wavelength λn+1, etc. As is illustrated below the actual diagram in FIG. 3, the respective spectral ranges Δλn, . . . , Δλn+4 of each three successive output ports n, . . . , n+4, exhibit a partial overlap: the spectral range Δλn of the first output port partially overlaps with the spectral ranges Δλn+1 and Δλn+2 of the ports n+1 and n+2, etc.

The reflection curve of the interrogated FBG is labeled 'FBG'. Because of the spectral arrangement of the output ports 149, the Bragg wavelength λB of the FBG 122 falls within the spectral ranges of at least three successive output ports of said plurality of output ports. In the depicted situation, for instance, the Bragg wavelength λB of the FBG falls within the spectral ranges Δλn+1, Δλn+2 and Δλn+3 of the output ports 149 numbered n+1, n+2 and n+3. It will be clear from FIG. 3 that this situation does not fundamentally change when the Bragg wavelength λB of the FBG shifts during operation, e.g. within the indicated dynamic range of interest Δλdyn,B of the FBG: at any given Bragg wavelength λB within the dynamic range Δλdyn,B, the FBG's Bragg wavelength will fall within the spectral ranges of at least three successive output ports. Consequently, the light reflected by the FBG upon interrogation is always divided between those output ports.

Figure 4:
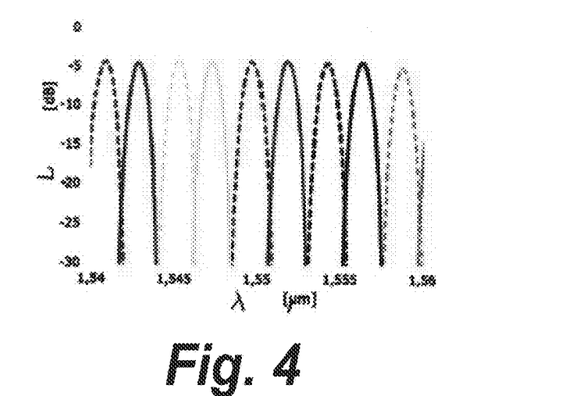
FIG. 4 schematically illustrates a partial transmission power spectrum of each 5th output channel of the spectrally selective device of the fiber Bragg grating interrogator assembly according to the present invention shown in FIG. 1, where L indicates transmission power and λ wavelength.

FIG. 4 schematically illustrates a partial transmission power spectrum of each 5th output channel of the spectrally selective device of the fiber Bragg grating interrogator assembly according to the present invention shown in FIG. 1. The solid line represents the channel response for the TE mode whereas the dashed line represents the channel response for the TM mode. A same colour is used for a same output port. As may be inferred from FIG. 4, the spectrally selective device of the FBG interrogator assembly is configured to split two orthogonal polarization components, in particular the TE mode wave and the TM mode wave, of incoming light onto substantially non-overlapping spectral ranges, as illustrated in FIG. 4, in the spectral energy distribution of said output ports (149-n). In particular, from FIG. 4 it follows that the two substantially non-overlapping spectral ranges concerning each pair of orthogonal polarization components of incoming light, is associated with a respective (single) output port. In other words: each output port can have two substantially non-overlapping spectral ranges, one for each polarization component. In an optimally tuned assembly, as for example illustrated in FIG. 4, the channel responses for a TE mode and a TM mode do not overlap but are adjacent, and their spectral ranges are around 2.0 nm each.

Figure 5:
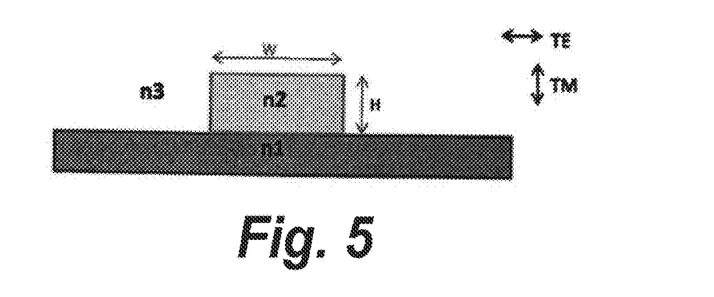
FIG. 5 schematically illustrates a simplified view of a ridge waveguide, which is part of the fiber Bragg grating interrogator assembly according to the present invention shown in FIG. 1.

FIG. 5 schematically illustrates a simplified view of a ridge waveguide, which is part of the fiber Bragg grating interrogator assembly according to the present invention shown in FIG. 1. The ridge waveguide's cross-section in this example has a rectangular shape with height H and width W. The waveguide has a refractive index n2 on a substrate of refractive index n1. The waveguide is surrounded by a medium of refractive index n3, for example of cladding material or surrounding air. To be able to guide light, n2 needs to be higher than both n1 and n3. The phase velocity, the speed at which a point of constant phase propagates, depends, among others, on the effective refractive index neff, which is lower than the refractive index of the waveguide n2, but higher than the refractive index of the surrounding medium n1 or n3. As light in vertical or horizontal direction is not confined by the same refractive index, the effective refractive index, and thus the propagation vector, are a function of the waveguide geometry and the refractive indices n1, n2, n3 such that the propagation vector of the TE and TM mode waves can be tuned by tuning the width and/or the height of the waveguide. The basic concept hereof is well explained in Arjen R. Vellekoop, "A Small-Size Polarization Splitter Based On A Planar Optical Phased Array", Journal of Lightwave Technology, Vol. 8, No. 1, January 1990, which is herein incorporated by reference in its entirety.

Figures 6A, 6B:
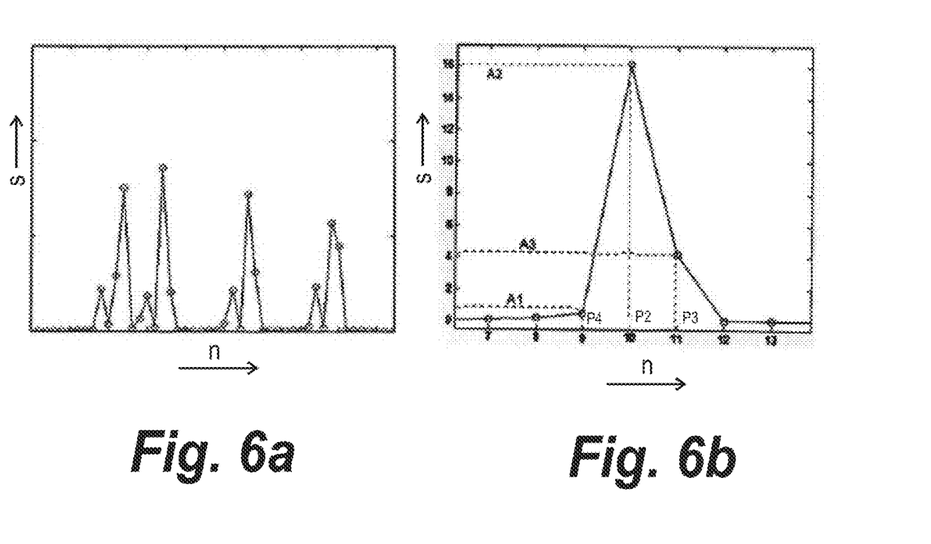
FIG. 6a schematically illustrates an example of a signal of 4 outputs of a spectrally selective device of the fiber Bragg grating interrogator assembly according to the present invention shown in FIG. 1, wherein S indicates signal and n the photodiode number.
FIG. 6b schematically illustrates a detail of a single peak of an example as in FIG. 6a, wherein S indicates signal and n the photodiode number.

FIG. 6a schematically illustrates an example of a raw signal from photodetectors 150-n, for example an array of photodiodes, of a spectrally selective device of the fiber Bragg grating interrogator assembly according to the present invention shown in FIG. 1, in case of 4 FBG sensors 122-k. The signal includes four double peaks, wherein one peak of each double peak is associated with a TE mode, and the other with a TM mode. FIG. 6b schematically illustrates a detail of a single peak of an example as in FIG. 6a. Using a diminished Dual Weighted Averaging algorithm modified for a polarization splitting AWG, the central wavelength of each peak, DWATE and DWATM, of a double peak can be determined (see example underneath). The central wavelength COG, independent of polarization, of a double peak in the signal can then be determined via a weighted mean of the central wavelengths of both peaks in a double peak DWATE and DWATM as $$COG = (1-W) \cdot DWA_{TE} + W \cdot DWA_{TM} \quad (1)$$

wherein a weight factor W is determined by the amplitude of both peaks of a double peak:

$$W = 0.5 + 0.5 \cdot \cos(AMP \cdot \pi/0.6 - 0.2 \cdot \pi/0.6) \quad (2)$$

wherein $$AMP = AMP_{TE}/(AMP_{TE} + AMP_{TM}). \quad (3)$$

If one peak of a double peak includes more than 80% of the power, the weight factors will only take into account that peak. Additionally, the amplitude difference between the two peaks forming a double peak is a measure for the polarization.

An example of an algorithm including a diminished Dual Weighted Averaging algorithm modified for a polarization splitting AWG comprises at least the following steps 250-256:

(250) read data of all photodetectors 150-n;
(251) number pixels (on X axis) and amplitudes of signal (on Y axis);
(252) calibrate data, for example subtract dark current;
(253) set a threshold value for a minimum amplitude of a signal;
(254) determine for each double peak signal which is a TE and TM peak;
(255) calculate DWA for each single peak (TE or TM) via an algorithm explained underneath;
(256) determine AMP of each single peak (TE or TM) via $$AMP = (DWA - P_{min}) \cdot A_{max} + (P_{max} - DWA) \cdot A_{min} \quad (4)$$

wherein
$P_{max}$ is a round-up of DWA to an integer pixel number,
$P_{min} = P_{max} - 1$ (such that $P_{min} < DWA \leq P_{max}$),
$A_{max}$ is the signal amplitude at pixel $P_{max}$,
$A_{min}$ is the signal amplitude at pixel $P_{min}$.

In practice, this algorithm does not immediately have to lead to linear results. The skilled person will appreciate that an additional initial calibration can be carried out to that aim.

DWA for each single peak (TE or TM), as is needed here-above, can be determined via:

$$DWA = W3 \cdot WA2 + W2 \cdot WA3 \quad (5)$$

wherein $$WA3 = \frac{P_1 \cdot A_1 + P_2 \cdot A_2 + P_3 \cdot A_3}{A_1 + A_2 + A_3} \quad (6)$$

with $P_2$ being the pixel number of a peak's maximum, $P_1$ being the pixel number of one pixel before the peak's maximum and $P_3$ being the pixel number of one pixel after the peak's maximum, $A_1$ the signal amplitude on pixel $P_1$, $A_2$ the signal amplitude (maximum) on pixel $P_2$, and $A_3$ the signal amplitude on pixel $P_3$, as is illustrated in FIG. 6b;

and wherein, if A1>A3, $$WA2 = \frac{P_1 \cdot A_1 + P_2 \cdot A_2}{A_1 + A_2} \quad (7a)$$

$$W2 = \frac{|A_1 - A_2|}{|A_1 - A_2| + |A_1 - A_3|} \quad (7b)$$

$$W3 = \frac{|A_1 - A_3|}{|A_1 - A_2| + |A_1 - A_3|} \quad (7c)$$

and wherein, if A3>A1, $$WA2 = \frac{P_2 \cdot A_2 + P_3 \cdot A_3}{A_2 + A_{32}} \quad (8a)$$

$$W2 = \frac{|A_2 - A_{32}|}{|A_2 - A_{32}| + |A_1 - A_3|} \quad (8b)$$

$$W3 = \frac{|A_1 - A_3|}{|A_2 - A_3| + |A_1 - A_3|}. \quad (8c)$$

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

What is claimed is:

1. A fiber Bragg grating interrogator assembly, comprising:
- an optical fiber including a fiber Bragg grating having a variable Bragg wavelength and a dynamic range of interest over which the Bragg wavelength can shift during use;
- a light source operably connected to the optical fiber, and configured to illuminate the fiber Bragg grating; and
- an response analyzer, including:
  - a spectrally selective device having an input port and a plurality of output ports, wherein the input port is operably connected to the optical fiber and wherein each of the output ports is associated with a respective spectral range, said spectrally selective device being configured to provide a spectral energy distribution of a response of the fiber Bragg grating received on the input port onto said output ports;
  - wherein the spectrally selective device is configured to split two orthogonal polarization components of incoming light onto substantially non-overlapping spectral ranges in the spectral energy distribution of said output ports, such that each output port has one spectral range for each of the two polarization components,
  - wherein the response analyzer includes a processing unit that is configured to use detection results regarding the split orthogonal polarization components to correct a polarization dependency of the spectrally selective device;
- a plurality of photodetectors optically coupled to said plurality of output ports in a one-to-one relationship, wherein each photodetector is configured to generate a signal indicative of an intensity of an optical signal received at the respective output port; and
- a processing unit, operably connected to the plurality of photodetectors, and configured to determine a current Bragg wavelength of the fiber Bragg grating from the signals of the photodetectors including correction for the polarization dependency of the spectrally selective device.

2. The assembly recited in claim 1, wherein the spectrally selective device is configured to split the polarization components of incoming light into a first polarization component comprising a transverse electric mode wave and into a second polarization component comprising a transverse magnetic mode wave onto substantially non-overlapping spectral ranges in the spectral energy distribution of said output ports.

3. The assembly recited in claim 1, wherein the spectrally selective device comprises an arrayed wave guide grating.

4. The assembly recited in claim 3, wherein the spectrally selective device comprises tunable waveguides, arranged to be tuned such that the polarization dispersion in the spectral energy distribution of said output ports is optimized to split two orthogonal polarization components of incoming light onto substantially non-overlapping spectral ranges in the spectral energy distribution of said output ports.

5. The assembly recited in claim 1, wherein the processing unit is configured to determine the current Bragg wavelength as an intensity-weighted mean wavelength including correction for the polarization dependency of the spectrally selective device.

6. The assembly recited in claim 1, wherein the processing unit is configured to determine the polarization correction wavelength as a ratio-based weighted mean wavelength of two polarization intensity-weighted mean wavelengths.

7. The assembly recited in claim 1, wherein at least one of the output ports has a spectral range of $\Delta\lambda_n$ extending from wavelength $\lambda_x$ to wavelength $\lambda_y$, wherein a respective channel response of a first polarization component has a spectral range of $\Delta\lambda_n/2$ extending from wavelength $\lambda_x$ to wavelength $(1/2)(\lambda_y\_\lambda_x)$, wherein a respective channel response of a second polarization component, has a spectral range of $\Delta\lambda_n/2$ extending from wavelength $(1/2)(\lambda_y\_\lambda_x)$ to wavelength $\lambda_y$.

8. The assembly recited in claim 1, wherein the spectral ranges of each at least three successive output ports partially overlap, such that the FBG's Bragg wavelength falls inside the spectral ranges of at least three successive output ports over the dynamic range of interest of the FBG.

* * * * *